United States Patent
Miyazaki

(10) Patent No.: US 7,268,187 B2
(45) Date of Patent: Sep. 11, 2007

(54) RUBBER COMPOSITION

(75) Inventor: Tatsuya Miyazaki, Kobe (JP)

(73) Assignee: Sumitomo Rubber Industries, Ltd., Kobe-shi, Hyogo-ken (JP)

( * ) Notice: Subject to any disclaimer, the term of this patent is extended or adjusted under 35 U.S.C. 154(b) by 1 day.

(21) Appl. No.: 11/209,784

(22) Filed: Aug. 24, 2005

(65) Prior Publication Data

US 2006/0047056 A1   Mar. 2, 2006

(30) Foreign Application Priority Data

Aug. 25, 2004   (JP) .............................. 2004-245402

(51) Int. Cl.
*C08L 9/00* (2006.01)

(52) U.S. Cl. ...................... 525/236; 525/236

(58) Field of Classification Search ................ 525/236, 525/331.9, 333.2
See application file for complete search history.

(56) References Cited

U.S. PATENT DOCUMENTS

| | | | | |
|---|---|---|---|---|
| 6,228,929 B1 * | 5/2001 | Larson et al. | ................ | 524/495 |
| 2006/0094825 A1 * | 5/2006 | Miyazaki | .................... | 525/336 |

FOREIGN PATENT DOCUMENTS

| JP | 54-132907 | A | | 10/1979 |
|---|---|---|---|---|
| JP | 5-320421 | A | | 12/1993 |
| JP | 6-87977 | A | | 3/1994 |
| JP | 8-85303 | | * | 4/1996 |
| JP | 8-85303 | A | | 4/1996 |
| JP | 8-333483 | | * | 12/1996 |
| JP | 8-333483 | A | | 12/1996 |
| JP | 10-110065 | A | | 4/1998 |

* cited by examiner

*Primary Examiner*—David W. Wu
*Assistant Examiner*—Rip A. Lee
(74) *Attorney, Agent, or Firm*—Birch, Stewart, Kolasch & Birch, LLP

(57) ABSTRACT

The present invention provides a rubber composition for a sidewall or a clinch having improved cut resistance, crack growth resistance and low fuel consumption for an automobile the present invention relates to a rubber composition for a side wall or a clinch comprising a rubber component containing:
(a) 20 to 60% by weight of polybutadiene rubber containing 2.5 to 20% by weight of crystal 1,2-syndiotactic polybutadiene,
(b) 5 to 40% by weight of a tin modified polybutadiene rubber polymerized by a lithium initiator, wherein the amount of tin atoms is 50 to 3000 ppm, the amount of vinyl bonds is 5 to 50% by weight and molecular weight distribution (mw/mn) is at most 2, and (c) 20 to 75% by weight of a rubber except for (a) and (b).

9 Claims, No Drawings

RUBBER COMPOSITION

BACKGROUND OF THE INVENTION

The present invention relates to a rubber composition for a sidewall or a clinch having improved cut resistance, crack growth resistance, and low fuel consumption of an automobile.

In order to improve cut resistance, crack growth resistance for a sidewall, a clinch of a tire, and low fuel consumption of an automobile, it is necessary to improve tan δ, hardness and stress and elongation (%) at break by tension for the rubber composition used for a sidewall and a clinch.

Conventionally, for the purpose of consuming low fuel in an automobile, a rubber composition for a sidewall employing a tin modified polybutadiene as a rubber component (see Japanese Unexamined Patent Publication No.5-320421) and a rubber composition for a sidewall employing a rubber composition containing crystal 1,2-syndiotactic polybutadiene as a rubber component (see Japanese Unexamined Patent Publication No.8-85303 and Japanese Unexamined Patent Publication No.10-110065) are disclosed.

However, there has been a problem that cut resistance and crack growth resistance are not sufficient in the technology described in Japanese Unexamined Patent Publication No.5-320421.

Also, there has been a problem that tan δ of the rubber composition was not decreased and sufficient low fuel consumption ability of an automobile in technology described in Japanese Unexamined Patent Publication No.8-85303 and Japanese Unexamined Patent Publication No.10-110065.

SUMMARY OF THE INVENTION

The object of the present invention is to provide a rubber composition for a sidewall or a clinch having improved cut resistance, crack growth resistance, and low fuel consumption of an automobile.

The present invention relates to a rubber composition for a side wall or a clinch comprising a rubber component containing (a) 20 to 60% by weight of a polybutadiene rubber containing 2.5 to 20% by weight of crystal 1,2-syndiotactic polybutadiene, (b) 5 to 40% by weight of a tin modified polybutadiene rubber polymerized by a lithium initiator, wherein the amount of tin atoms is 50 to 3000 ppm, the amount of a vinyl bond is 5 to 50% by weight and molecular weight distribution (Mw/Mn) is at most 2, and (c) 20 to 75% by weight of a rubber except for (a) and (b).

Also, the present invention relates to a sidewall and a clinch comprising the above mentioned rubber composition.

DETAILED DESCRIPTION

The rubber composition of the present invention comprises rubber components containing (a) a polybutadiene rubber containing crystal 1,2-syndiotactic polybutadiene, (b) a tin modified polybutadiene, and (c) 20 to 75% by weight of a rubber component except for (a) and (b).

Regarding a polybutadiene rubber containing crystal 1,2-syndiotactic polybutadiene (a) (BR (a)), crystal 1,2-syndiotactic polybutadiene is not BR (a) in which crystals are simply dispersed but the crystals are preferably dispersed after chemically bonding with BR (a). By dispersing the above mentioned crystals after chemically bonding with a rubber component, and development and diffusion of clacks tend to be inhibited.

The melting point of crystal 1,2-syndiotactic polybutadiene is preferably at least 180° C., and more preferably at least 190° C. If the melting point is less than 180° C., the crystals melts while a tire is vulcanized at press and the hardness tends to be lowered. Also, the melting point of crystal 1,2-syndiotactic polybutadiene is preferably at most 220° C., and more preferably at most 210° C. If the melting point is more than 220° C., dispersibility in the rubber composition tends to degrade since the molecular weight of BR (a) becomes large.

In BR (a), the amount of the portion insoluble in boiling n-hexane is preferably at least 2.5% by weight, and more preferably 8% by weight. If the amount is less than 2.5% by weight, sufficient hardness for the rubber composition does not tend to be gained. Also, the amount of the portion insoluble in boiling n-hexane is preferably at most 22% by weight, more preferably at most 20% by weight, and far more preferably at most 18% by weight. If the amount is more than 22% by weight, viscosity of BR (a) itself is high and dispersibility of BR (a) and a filler in the rubber composition tends to decrease. Herein, the portion insoluble in boiling n-hexane is defined as 1,2-syndiotactic polybutadiene (SPBD) in BR (a).

In BR (a), the amount of crystal 1,2-syndiotactic polybutadiene is preferably at least 2.5% by weight, and more preferably at least 10% by weight. If the amount is less than 2.5% by weight, the hardness is not sufficient. In BR (a), the amount of crystal 1,2-syndiotactic polybutadiene is preferably at most 20% by weight, and more preferably at most 18% by weight. If the amount is more than 20% by weight, BR (a) has difficulty in dispersing in the rubber composition and the processability becomes worse.

The amount of BR (a) is preferably at least 20% by weight, and more preferably at least 30% by weight. If the amount is less than 20% by weight, cut resistance and crack growth resistance become inferior. Also, the amount of BR (a) is preferably at most 60% by weight, and more preferably at most 50% by weight. If the amount is more than 60% by weight, tensile strength and elongation of the rubber composition becomes worse and that leads to decrease the amount of BR (b) in the rubber composition, and tan δ becomes degraded.

A tin modified polybutadiene rubber (b) (BR (b)) can be obtained by adding a tin compound after polymerizing 1,3-butadiene with a lithium initiator. Also, the end of a molecule of BR (b) is preferably bonded with a tin-carbon bond.

As a lithium initiator, examples are lithium compounds such as alkyl lithium, aryl lithium, allyl lithium, vinyl lithium, organic tin lithium, and organic nitrogen lithium. By using the lithium compounds as an initiator for BR (b), BR (b) with a high amount of vinyl and a low amount of cis compound can be prepared.

As a tin compound, examples are tin tetrachloride, butyl tin trichloride, dibutyl tin dichloride, dioctyl tin dichloride, tributyl tin chloride, triphenyl tin chloride, diphenyldibutyl tin, triphenyl tin ethoxide, diphenyl dimethyl tin, ditolyl tin chloride, diphenyl tin octanoate, divinyl diethyl tin, tetrabenzyl tin, dibutyl tin distearate, tetraallyl tin, and p-tributyl tin styrene and, among those, one or two kinds can be selected to employ.

In BR (b), the amount of tin atoms is at least 50 ppm and preferably at least 60 ppm. If the amount is less than 50 ppm, the effect of promoting dispersion of carbon black in BR (b) is small and tan is degraded. Also, the amount of tin atoms is at most 3000 ppm, preferably at most 2500 ppm, and far more preferably at most 250 ppm. If the amount is more than 3000 ppm, since cohesiveness (rubber fragments cohere together without scattering) for the kneaded product becomes low and the edge is not straightened, extrusion properties of the kneaded product becomes worse.

Molecular weight distribution (Mw/Mn) of BR (b) is at most 2 and preferably at most 1.5. If Mw/Mn is more than 2, dispersibility of carbon black and tan δ become worse.

The amount of a vinyl bond in BR (b) is at least 5% by weight and preferably at least 7% by weight. If the amount is more than 5% by weight, polymerization (preparation) of BR (b) becomes difficult. Also, the amount of a vinyl bond is at most 50% by weight and preferably at most 20% by weight. If the amount of a vinyl bond is less than 50% by weight, abrasion resistance (abrasion resistance when a sidewall rubs against the outside) becomes significantly worse.

The amount of BR (b) in rubber components is at least 5% by weight and preferably at least 10% by weight. If the amount is less than 5% by weight, effects of lowering tan δ can not be obtained sufficiently. Also, the amount of BR (b) in rubber components is at most 40% by weight and preferably at most 35% by weight. If the amount is more than 40% by weight, effects of lowering tan δ can not be improved, and the total amount of a rubber (c) and BR (b) becomes less than 60% and tensile strength and hardness become low.

A rubber (c) is a rubber except for a rubber (a) and a rubber (b). Concretely, examples are a natural rubber (NR), an isoprene rubber (IR), a styrene-butadiene rubber (SBR), and high cis-1,4-polybutadiene rubber except for BR (a) and BR (b). Among those, a natural rubber is preferable since tensile strength is excellent.

The amount of a rubber (c) in the rubber components is at least 20% by weight and preferably at least 30% by weight. If the amount is less than 20% by weight, sufficient tensile strength can not be obtained. Also, the amount of BR (c) in the rubber components is at most 75% by weight and preferably at most 60% by weight. If the amount is more than 75% by weight, the total amount of BR (a) and BR (b) becomes less than 25% and lowering tan δ and improvement in the hardness are not achieved.

By preparing a rubber component combined with the above mentioned BR (a), BR (b) and a rubber (c), tan δ can be significantly lowered without lowering hardness and stress at break.

Except for the above mentioned rubber components, the rubber composition of the present invention can contain a filler for reinforcement such as carbon black, silica, calcium carbonate, and clay, a softener such as an aroma oil, a wax, an antioxidant, a stearic acid, zinc oxide, a vulcanizing agent such as sulfur, and a vulcanizing accelerator, if necessary.

By combining BR (a), BR (b) and a rubber (c), and by further decreasing a filler for reinforcement in an amount of 25 to 50 parts by weight based on 100 parts by weight of the rubber component, the rubber composition of the present invention can significantly lower tan δ without lowering hardness of the rubber composition and stress at break.

Since among tire parts the rubber composition of the resent invention has excellent crack growth resistance deformation of repeating high stress at a wide range of a temperature (−50 to 100° C.), and tan δ is lowered, the rubber composition of the present invention can be used for a sidewall and a clinch to prepare a tire.

Also, in case that the rubber composition of the present invention can be employed for a sidewall, nitrogen absorbing-specific surface area ($N_2SA$) of carbon black is preferably 25 to 50 $m^2/g$. If $N_2SA$ is less than 25 $m^2/g$, abrasion resistance tends to be worse, and if $N_2SA$ is more than 50 $m^2/g$, tan δ tends to be worse.

Also, in case that the rubber composition of the present invention can be employed for a sidewall, the amount of carbon black is preferably at least 25 parts by weight based on 100 parts by weight of the rubber component. If the amount is less than 25 parts by weight, hardness is not sufficient and cut resistance tends to be worse. Also the amount of carbon black is preferably at most 60 parts by weight and more preferably at most 50 parts by weight. If the amount is more than 60 parts by weight, tan δ tends to be worse.

Also, in case that the rubber composition of the present invention can be employed for a clinch, nitrogen absorbing-specific surface area ($N_2SA$) of carbon black is preferably 70 to 100 $m^2/g$. If $N_2SA$ is less than 70 $m^2/g$, abrasion resistance tends to be worse, and if $N_2SA$ is more than 100 $m^2/g$, tan δ tends to be worse.

Also, in case that the rubber composition of the present invention can be employed for a clinch, the amount of carbon black is preferably 40 to 60 parts by weight. If the amount is less than 40 parts by weight, the hardness is not sufficient and abrasion resistance in a rim tends to be worse, and if the amount is more than 60 parts by weight, tan δ tends to be worse.

In the rubber composition of the present invention, rubber components and, if necessary, the above mentioned chemicals are kneaded to prepare a unvulcanized tire on a tire molding machine, by extrusion processing a sidewall and a clinch adjusting the form of them in a step of unvulcanization, and further, a tire is obtained by heat-pressuring the unvulcainzed tire in a vulcanizer.

EXAMPLES

Hereinafter, the present invention is explained in detail in Examples, but is not limited thereto.

Various chemicals used in Examples are described below.

Polymer A: VCR 617 (crystal 1,2-syndiotactic polybutadiene, the amount of crystal 1,2-syndiotactic polybutadiene: 17% by weight, the melting point of crystal 1,2-syndiotactic polybutadiene: 200° C., the amount of a portion insoluble in boiling n-hexane: 15 to 18% by weight) available from Ube Industries, Ltd.

Polymer B: BR 1250 (polymerizing by using lithium as an initiator, the amount of a vinyl bond: 10 to 13% by weight, Mw/Mn: 1.5, the amount of tin atoms: 250 ppm) available from ZEON CORPORATION Natural Rubber: RSS#3

1,4 high-cis BR: BR 150B available from Ube Industries, Ltd.

Carbon black: FEF (N550) (N2SA: 42 $m^2/g$) available from Mitsubishi Chemical Corp.

Aroma oil: Diana Process AH-24 available from Idemitsu Kosan Co., Ltd.

Wax: SUNNOC Wax available from Ouchi Shinko Chemical Industrial Co., ltd.

Antioxidant: NOCRAC 6C available from Ouchi Shinko Chemical Industries Co., Ltd.

Stearic acid: Stearic acid available from NOF Corporation

Zinc oxide: Zinc Oxide type 1 available from Mitsui Mining and Smelting Co., Ltd.

Sulfur: Powdery sulfur available from Karuizawa Iou Kabushikigaisya

Vulcanization accelerator: Nocceler NZ available from Ouchi Shinko Chemical Industrial Co., Ltd.

EXAMPLES 1 TO 6 AND COMPARATIVE EXAMPLES 1 TO 7

(Preparation of a Rubber Sample)

Various chemicals such as a polymer except for a vulcanization filler such as sulfur and a vulcanization accelerator were kneaded in a BR banbury mixer according to compositions in Table 1 and, subsequently, thereto were added the vulcanization filler and the mixture was kneaded in an 8 inch roll to obtain an unvulcanized rubber composition. A rubber sample was prepared by vulcanizaiton molding with pressure of 25 kgf/cm$^2$ for 30 minutes at 150° C. Measurement was conducted by using the obtained rubber sample as shown below.

(Hardness (Hs))

The hardness of the test sample was measured by using JIS-A hardness scale.

(Tan δ)

The loss coefficient tan δ was measured by using a viscoelasticity spectrometer (made by Iwamoto Corporation) at 70° C. and at 10 Hz of frequency under initial strain of 10% and dynamic strain of 2%.

(Cut Resistance)

A cut was added by using a 20 mm width steel blade in an impact pendulum machine of a cut resistance index and the depth of the cut was respectively represented as an index regarding Comparative Example 7 as 100. The larger the index is, the more excellent cut resistance is.

(Crack Growth Resistance)

In accordance with JIS-K6301 test, the length of crack was measured after bending 120,000 times. Length of crack growth was respectively represented as an index, regarding Comparative Example 7 as 100. The larger the index is, the more excellent cut crack growth resistance is.

The results were shown in Table 1.

According to the present invention, a rubber composition for a sidewall or a clinch having improved cut resistance, crack growth resistance and low fuel consumption of an automobile can be provided by using (a) a polybutadiene rubber containing crystal 1,2-syndiotactic polybutadiene, (b) a tin modified polybutadiene, and (c) 20 to 75% by weight of a rubber component except for (a) and (b).

What is claimed is:

1. A rubber composition for a side wall or a clinch comprising a rubber component containing:
   (a) 20 to 60% by weight of polybutadiene rubber containing 2.5 to 20% by weight of crystal 1,2-syndiotactic polybutadiene,
   (b) 5 to 40% by weight of a tin modified polybutadiene rubber polymerized by a lithium initiator, wherein the amount of tin atoms is 50 to 3000 ppm, the amount of vinyl bonds is 5 to 50% by weight and molecular weight distribution (Mw/Mn) is at most 2, and
   (c) 20 to 75% by weight of a rubber except for (a) and (b).

2. A side wall comprising the rubber composition of claim 1.

3. A clinch comprising the rubber composition of claim 1.

4. The side wall according to claim 2, wherein the polybutadiene rubber (a) is present in the amount of 30 to 50% by weight and contains 10 to 18% by weight of crystal 1,2-syndiotactic polybutadiene.

5. The clinch according to claim 3, wherein the polybutadiene rubber (a) is present in the amount of 30 to 50% by weight and contains 10 to 18% by weight of crystal 1,2-syndiotactic polybutadiene.

6. A side wall according to claim 2, wherein the tin modified polybutadiene rubber (b) is present in an amount of 10 to 35% by weight, and wherein the amount of tin atoms is 60 to 2500 ppm, the amount of vinyl bonds is 7 to 20% by weight and the molecular weight distribution (Mw/Mn) is at most 1.5.

TABLE 1

| | Ex. | | | | | | Com. Ex. | | | | | | |
|---|---|---|---|---|---|---|---|---|---|---|---|---|---|
| | 1 | 2 | 3 | 4 | 5 | 6 | 1 | 2 | 3 | 4 | 5 | 6 | 7 |
| Composition (parts by weight) | | | | | | | | | | | | | |
| Polymer A | 30 | 30 | 50 | 40 | 30 | 60 | 60 | 80 | 10 | — | 60 | — | — |
| Polymer B | 30 | 20 | 20 | 10 | 40 | 10 | — | — | — | 60 | 40 | 20 | — |
| Natural rubber | 40 | 50 | 30 | 50 | 30 | 30 | 40 | 20 | 40 | 40 | — | 40 | 40 |
| 1,4 high cis-BR | — | — | — | — | — | — | — | — | 50 | — | — | 40 | 60 |
| Carbon black | 50 | 50 | 50 | 50 | 50 | 40 | 50 | 50 | 50 | 50 | 50 | 50 | 50 |
| Aroma oil | 6 | 6 | 6 | 6 | 6 | 6 | 6 | 6 | 6 | 6 | 6 | 6 | 6 |
| Wax | 1 | 1 | 1 | 1 | 1 | 1 | 1 | 1 | 1 | 1 | 1 | 1 | 1 |
| Antioxidant | 3 | 3 | 3 | 3 | 3 | 3 | 3 | 3 | 3 | 3 | 3 | 3 | 3 |
| Stearic acid | 2 | 2 | 2 | 2 | 2 | 2 | 2 | 2 | 2 | 2 | 2 | 2 | 2 |
| Zinc oxide | 3 | 3 | 3 | 3 | 3 | 3 | 3 | 3 | 3 | 3 | 3 | 3 | 3 |
| Sulfur | 2.0 | 2.0 | 2.0 | 2.0 | 2.0 | 2.0 | 2.0 | 2.0 | 2.0 | 2.0 | 2.0 | 2.0 | 2.0 |
| Vulcanization accelerator | 1.5 | 1.5 | 1.5 | 1.5 | 1.5 | 1.5 | 1.5 | 1.5 | 1.5 | 1.5 | 1.5 | 1.5 | 1.5 |
| Evaluation results | | | | | | | | | | | | | |
| Hs | 64 | 65 | 66 | 65 | 65 | 65 | 66 | 68 | 64 | 62 | 66 | 64 | 64 |
| tanδ | 0.08 | 0.09 | 0.09 | 0.10 | 0.07 | 0.09 | 0.16 | 0.17 | 0.15 | 0.07 | 0.08 | 0.12 | 0.15 |
| Cut resistance | 100 | 102 | 105 | 101 | 102 | 95 | 104 | 106 | 101 | 80 | 90 | 90 | 100 |
| Crack growth resistance | 97 | 101 | 99 | 100 | 95 | 105 | 100 | 80 | 100 | 70 | 85 | 90 | 100 |

7. A clinch according to claim 3, wherein the tin modified polybutadiene rubber (b) is present in an amount of 10 to 35% by weight, and wherein the amount of tin atoms is 60 to 2500 ppm, the amount of vinyl bonds is 7 to 20% by weight and the molecular weight distribution (Mw/Mn) is at most 1.5.

8. The sidewall according to claim 2, wherein the rubber (c) is present in an amount of 30 to 60% by weight.

9. The sidewall according to claim 3, wherein the rubber (c) is present in an amount of 30 to 60% by weight.

* * * * *